United States Patent
Saadoun et al.

(10) Patent No.: US 10,481,599 B2
(45) Date of Patent: Nov. 19, 2019

(54) METHODS AND SYSTEMS FOR CONTROLLING AN OBJECT USING A HEAD-MOUNTED DISPLAY

(71) Applicant: MOTOROLA SOLUTIONS, INC., Chicago, IL (US)

(72) Inventors: Fabrice Saadoun, Jerusalem (IL); Dafna Langerman, Givataim (IL); Pavel Livshits, Modiin (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 11 days.

(21) Appl. No.: 15/658,096

(22) Filed: Jul. 24, 2017

(65) Prior Publication Data
US 2019/0025815 A1    Jan. 24, 2019

(51) Int. Cl.
*G06F 3/01*    (2006.01)
*G05D 1/00*    (2006.01)
(Continued)

(52) U.S. Cl.
CPC ....... *G05D 1/0016* (2013.01); *G02B 27/0172* (2013.01); *G05D 1/0033* (2013.01); *G05D 1/101* (2013.01); *G06F 3/011* (2013.01); *G06F 3/013* (2013.01); *G06F 3/017* (2013.01); *G06F 3/0346* (2013.01); *G06F 3/0383* (2013.01); *G02B 2027/014* (2013.01);
(Continued)

(58) Field of Classification Search
CPC ... G02B 27/017; G02B 27/0172; G06F 3/013; G06F 3/012
See application file for complete search history.

(56) References Cited

U.S. PATENT DOCUMENTS

| 8,032,842 B2 | 10/2011 | Kwon et al. |
| 2015/0309316 A1* | 10/2015 | Osterhout ............... G06F 3/012 345/8 |

(Continued)

OTHER PUBLICATIONS

Ettikkalayil et al. "AR.Drone Eye-control—Biomedical Engineering at CCNY," YouTube (published on Sep. 18, 2013) 1 page, https://www.youtube.com/watch?v=VDBBRFX9eiU.
(Continued)

*Primary Examiner* — Dennis P Joseph
(74) *Attorney, Agent, or Firm* — Michael Best & Friedrich LLP (57) ABSTRACT

Methods and systems for controlling an object using a head-mounted display. One head-mounted display includes a display projector. The head-mounted display further includes an eye tracking assembly configured to monitor an eye. The head-mounted display further includes an electronic processor coupled to the display projector and the eye tracking assembly. The electronic processor is configured to determine a depth of field measurement of the eye and determine that the depth of field measurement is greater than a predetermined distance. The electronic processor is further configured to control the display projector to project a virtual line in response to determining that the depth of field measurement is greater than the predetermined distance. The virtual line is projected such that a length of the virtual line corresponds to a range of measurable depth of field measurements of the eye.

20 Claims, 7 Drawing Sheets

(51) Int. Cl.
*G02B 27/01* (2006.01)
*G06F 3/038* (2013.01)
*G06F 3/0346* (2013.01)
*G05D 1/10* (2006.01)

(52) U.S. Cl.
CPC ... *G02B 2027/0141* (2013.01); *G05D 1/0022* (2013.01); *G06F 2203/0383* (2013.01)

(56) References Cited

U.S. PATENT DOCUMENTS

| | | | |
|---|---|---|---|
| 2016/0147408 A1 | 5/2016 | Bevis et al. | |
| 2017/0161951 A1* | 6/2017 | Fix | G09G 5/00 |
| 2017/0336863 A1* | 11/2017 | Tilton | G06F 3/012 |

OTHER PUBLICATIONS

Hansen et al., "The Use of Gaze to Control Drones," paper (2014) Proceedings of the ACM Symposium on Eye Tracking Research and Applicatons—ETRA, 14 pages, New York (http://www.yorku.ca/mack/etra2014.html.
Smootheye, "Advanced Research Eye Tracker with 1000Hz Sampling Rate," article (2016) 3 pages, http://www.smootheye.com/.
Alapetite et al. "Gaze Controlled Flying," YouTube (published on Oct. 22, 2012) The 7th Nordic Cnference on Human-Computer Interaction, 1 page, https://youtu.be/87loWDCf9vk.
Parra et al., "EyeDrone-Eye-gaze controlled navigation," YouTube (published on Sep. 25, 2011) 1 page, https://youtu.be/l3Ch-qr53k0.

* cited by examiner

METHODS AND SYSTEMS FOR CONTROLLING AN OBJECT USING A HEAD-MOUNTED DISPLAY

BACKGROUND OF THE INVENTION

A movable device such as a drone, a vehicle, a boat, and the like may be controlled by remote users using a communication device that communicates wirelessly with the movable device. For example, remote users may manually manipulate navigation input buttons on a hand-held communication device to control the movable device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a head-mounted display that includes a display projector. The head-mounted display further includes an eye tracking assembly configured to monitor an eye. The head-mounted display further includes an electronic processor coupled to the display projector and the eye tracking assembly. The electronic processor is configured to determine a depth of field measurement of the eye and determine that the depth of field measurement is greater than a predetermined distance. The electronic processor is further configured to control the display projector to project a virtual line in response to determining that the depth of field measurement is greater than the predetermined distance. The virtual line is projected such that a length of the virtual line corresponds to a range of measurable depth of field measurements of the eye.

Another embodiment provides a method of controlling an object using a head-mounted display. The method includes determining, with an electronic processor, a depth of field measurement of an eye based on information received from an eye tracking assembly monitoring the eye. The method further includes determining, with the electronic processor, that the depth of field measurement is greater than a predetermined distance. The method further includes controlling, with the electronic processor, a display projector to project a virtual line in response to determining that the depth of field measurement is greater than the predetermined distance. The virtual line is projected such that a length of the virtual line corresponds to a range of measurable depth of field measurements of the eye.

Another embodiment provides an apparatus including an eye tracking assembly configured to determine eye gaze of an eye and determine a depth of field measurement of the eye based on a lens distortion of the eye. The apparatus further includes a display projector coupled to the eye tracking assembly. The display projector projects a virtual depth guidance element when the depth of field measurement exceeds a predetermined threshold. The virtual depth guidance element includes one or more virtual indicators each corresponding to a measurable depth of field measurement of the eye. The apparatus further includes a network interface configured to transmit a movement command to a movable device. The movement command corresponds to a second depth of field measurement of the eye determined when the eye is looking at and is focused on one of the one or more virtual indicators on the virtual depth guidance element.

Figure 1:
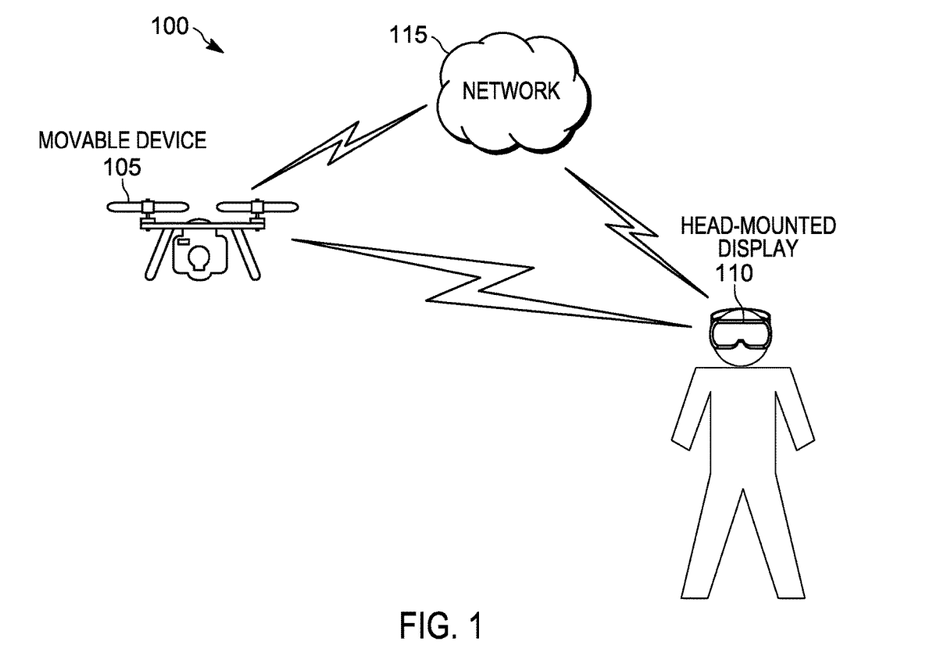
FIG. 1 is a diagram of a communication system according to one embodiment.

FIG. 1 is a diagram of a communication system 100 according to one embodiment. In the example illustrated, the communication system 100 includes a movable device 105, a head-mounted display 110, and a network 115. In FIG. 1, the movable device 105 is shown as a drone (that is, a pilotless aircraft that is remote-controlled by a user). In other embodiments, the movable device 105 may be another device that is remote-controlled by a user such as a boat, a vehicle, and the like. In some embodiments, the head-mounted display 110 is worn by a user and may be used to control the movable device 105. As shown in FIG. 1, the head-mounted display 110 and the movable device 105 may communicate with each other over the network 115 (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned. Also as shown in FIG. 1, in some embodiments, the head-mounted display 110 and the movable device 105 may communicate directly with each other using a communication channel or connection that is outside of the network 115.

Figure 2:
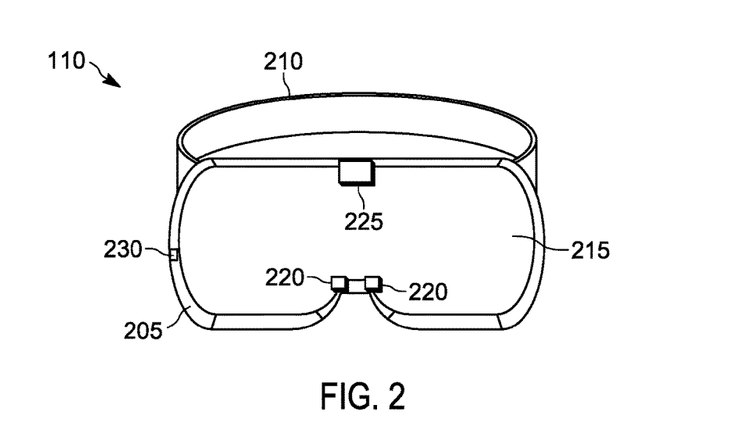
FIG. 2 illustrates a head-mounted display of the communication system of FIG. 1 according to one embodiment.

FIG. 2 illustrates the head-mounted display 110 of the communication system 100 according to one embodiment. In the example illustrated, the head-mounted display 110 includes a frame 205 that includes a strap 210 to secure the head-mounted display 110 on the head of the user. A lens system 215 is secured within the frame 205. In some embodiments, the eyes of the user are able to look through the lens system 215 such that the user may view the surrounding environment as well as content rendered by the head-mounted display 110 (in other words, the head-mounted display 110 may be augmented reality goggles). In other embodiments, the user may not be able to look through the lens system 215 to view the surrounding environment (in other words, the head-mounted display 110 may be virtual reality goggles).

The head-mounted display 110 also includes an eye tracking assembly 220 such as an eye tracking camera. Although FIG. 2 shows two eye tracking assemblies 220, in some embodiments, the head-mounted display 110 has fewer or additional eye tracking assemblies. The position of the eye tracking assembly 220 in FIG. 2 is merely an example. In some embodiments, the eye tracking assembly 220 may be located elsewhere on the head-mounted display 110. The eye tracking assembly 220 may, for example, be located outside of the lens system 215 or inside of the lens system 215. The eye tracking assembly 220 (in combination with an electronic processor described in greater detail below) determines an eye gaze of the eyes of the user (that is, an eye gaze location or a direction in which the eyes of the user are looking within a field of vision of the user). For example, in some embodiments, the head-mounted display 110 includes one or more infrared projectors that project infrared light at the eyes of the user to allow the eye tracking assembly 220 to determine an eye gaze of the user. In such embodiments, the infrared projector may be coaxial with an optical path of the eyes and the eye tracking assembly 220 uses bright pupil eye tracking. In other embodiments, the infrared projector is offset from the optical path of the eyes and the eye tracking assembly 220 uses dark pupil tracking. In some embodiments, the head-mounted display 110 may not include an infrared projector and the eye tracking assembly 220 may determine the eye gaze of the user using, for example, corneal reflections of visible light. In other embodiments, the eye tracking assembly 220 may use another eye tracking method known to those skilled in the art. In some embodiments, the eye tracking assembly 220 may use later-developed eye tracking methods.

In addition to determining an eye gaze of the user, the eye tracking assembly 220 (in combination with the electronic processor described in greater detail below) determines a lens distortion of the eyes of the user that allows a depth of field of the eyes to be determined. The depth of field of the eyes corresponds to a distance at which the eyes are focused (that is, a focal distance of the eyes). For example, human eyes are generally able to distort their lenses to adjust focus such that some objects being viewed are in focus while other objects being viewed are out of focus. In other words, the eye gaze of the user may remain unchanged but the user may focus on different objects or at different focal distances within a line of sight.

In some embodiments, the eye tracking assembly 220 may be limited in the depth of field measurements that it is capable of making due to the typical behavior of human eyes. In particular, human eyes are generally able to adjust focus more effectively when objects being viewed are at a close distance to the eyes (that is, a short focal distance) than when objects being viewed are at a far distance from the eyes (that is, a long focal distance). For example, the lenses of the eyes of a user may be able to distort to change focal distances when focused on objects within approximately seven to ten meters of the eyes. However, when an object is beyond approximately seven to ten meters from the eyes, the lens distortion of the eyes may reach a maximum (that is, a focal distance of infinity) such that the lens distortion of the eyes does not change for objects viewed beyond approximately seven to ten meters. Accordingly, the lens distortion of the eyes of a user may remain unchanged when the eyes focus on an object that is located fifteen, thirty, fifty, or a thousand meters away, for example. As such, the eye tracking assembly 220 may not be able to determine whether the depth of field of the eyes of the user is fifteen, thirty, fifty, or a thousand meters or a different distance. For similar reasons, the eye tracking assembly 220 may not be able to determine a depth of field of the eyes of the user when the eyes are not focused on a particular object but are instead looking toward a point in in the sky, for example.

The limited range in which the eye tracking assembly 220 is capable of measuring different lens distortions of the eyes is referred to herein as a range of measureable depth of field measurements of the eyes. The above example range of measurable depth of field measurements of less than approximately seven to ten meters is merely an example and may vary depending on the capability of the eyes of each user. In some embodiments, the range of measureable depth of field measurements includes focal distances of less than approximately five to nine meters. In some embodiments, the range of measureable depth of field measurements includes focal distances of less than approximately eight to twelve meters. In some embodiments, the range of measurable depth of field measurements may be greater than the largest example distance provided above in light of, for example, newly-developed eye tracking systems and methods.

As shown in FIG. 2, the head-mounted display 110 also includes a display projector 225. In some embodiments, the display projector 225 displays images on the lens system 215. In other embodiments, the display projector 225 renders images directly on the eyes of the user. In yet other embodiments, the display projector 225 may be incorporated into the lens system 215 such that the lens system 215 is capable of displaying images. For example, a flexible organic light-emitting diode (OLED) display may be used to display images. In some embodiments, the head-mounted display 110 includes more than one display projector 225. The display projector 225 may display images in various ways that are perceivable to the eyes of the user (that is, text, icons, photos, videos, and the like).

The display projector 225 may display images at a predetermined location within a field of vision of the user (that is, at a predetermined eye gaze location of the user). Additionally, the display projector 225 may display images such that the images appear to be at a predetermined depth of field of the eyes of the user. For example, an image may be displayed such that the image appears to be in focus when the eyes of the user focus at a distance of one meter. However, the same image may appear to be out of focus when the eyes of the user focus at another distance (for example, three meters).

In some embodiments, the head-mounted display 110 includes a button 230 that may be referred to as a virtual line actuator as explained in greater detail below. In some embodiments, the button 230 may be located in other locations on the head-mounted display 110 than the location shown in FIG. 2. In some embodiments, the head-mounted display 110 includes additional buttons.

The head-mounted display 110 shown in FIG. 2 is merely an example. Although FIG. 2 illustrates a single lens system 215, in some embodiments, the lens system 215 includes multiple lenses. Furthermore, the lens system 215 may be any existing lens system or later-developed lens system. In some embodiments, the head-mounted display 110 may include earpieces to secure the head-mounted display 110 to the head of the user instead of the strap 210. In some embodiments, the frame 205 may not be present at all (that is, the display projector 225 may be mounted on an earpiece, for example, and may render images directly on the eyes of the user as mentioned previously).

Figure 3:
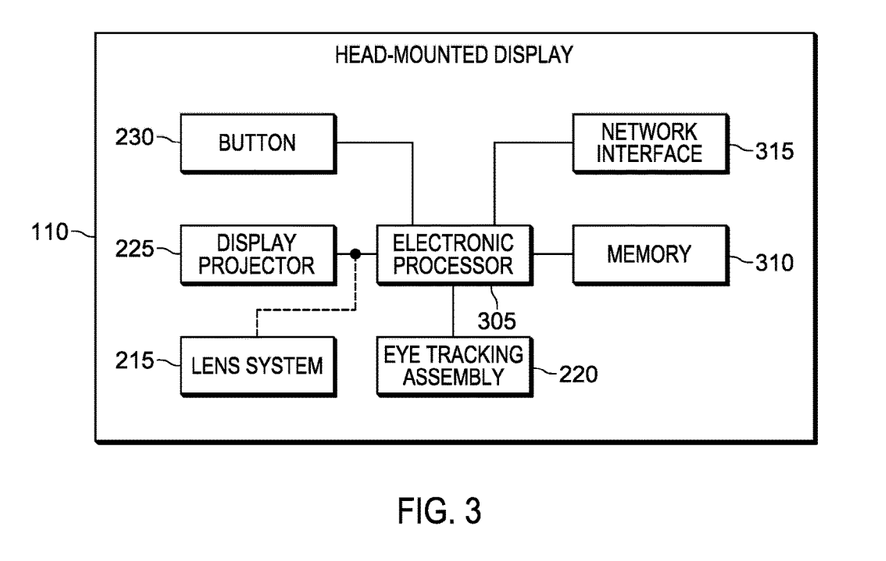
FIG. 3 is a diagram of the head-mounted display of FIG. 2 according to one embodiment.

FIG. 3 is a diagram of the head-mounted display 110 according to one embodiment. In addition to the lens system 215, the eye tracking assembly 220, and the display projector 225, the head-mounted display 110 includes an electronic processor 305 (for example, a microprocessor or another electronic device). The electronic processor 305 may include input and output interfaces (not shown) and be electrically connected to a memory 310, a network interface 315, the eye tracking assembly 220, the display projector 225, and the button 230. In some embodiments, the head-mounted display 110 may include fewer or additional components in configurations different from that illustrated in FIG. 3. For example, in some embodiments, the head-mounted display 110 also includes a microphone, a speaker, and a location component (for example, a global positioning system (GPS) receiver). As another example, the head-mounted display 110 may include gyroscopes or accelerometers to measure head movement of the user. As another example, the head-mounted display 110 may include one or more infrared projectors as explained previously. In embodiments where the display projector 225 is integrated within the lens system 215, the electronic processor 305 is electrically connected to the lens system 215 as indicated by the dashed line in FIG. 3. In some embodiments, the head-mounted display 110 performs additional functionality than the functionality described below.

The memory 310 includes read only memory (ROM), random access memory (RAM), other non-transitory computer-readable media, or a combination thereof. The electronic processor 305 is configured to receive instructions and data from the memory 310 and execute, among other things, the instructions. In particular, the electronic processor 305 executes instructions stored in the memory 310 to perform the methods described herein.

The network interface 315 sends and receives data to and from the movable device 105 either directly and/or through the network 115. For example, the network interface 315 may include a transceiver for wirelessly communicating with the movable device 105. Alternatively or in addition, the network interface 315 may include a connector or port for receiving a wired connection to the network 115, such as an Ethernet cable. In some embodiments, the network interface 315 is, for example, a radio frequency modem, a frequency modulation two-way radio, a long-term evolution (LTE) transceiver, a code division multiple access (CDMA) transceiver, a Wi-Fi (that is, IEEE 802.11x) modules, or the like.

The eye tracking assembly 220, the electronic processor 305, or a combination thereof determines an eye gaze location and a depth of field measurement of the eyes of the user as described previously herein. In some embodiments, the electronic processor 305 communicates a movement command to the movable device 105 through the network interface 315 based on information relating to the eye gaze location and the depth of field measurement. The electronic processor 305 may also receive information through the network interface 315 from other devices (for example, the movable device 105) such as a location of the movable device 105 with respect to the head-mounted display 110. In other words, the electronic processor 305 may determine the distance between the movable device 105 and the head-mounted display 110 based on information received from the movable device 105. In some embodiments, the electronic processor 305 controls the display projector 225 to display an image based on the information received through the network interface 315 as explained in greater detail below. In some embodiments, the electronic processor 305 may output data received from other devices through the network interface 315 through the display projector 225, a speaker, or a combination thereof (for example, a message received from a communication device of another user).

In some embodiments, the movable device 105 includes similar components as the head-mounted display 110. For example, the movable device 105 may include an electronic processor, a memory, and a network interface that operate similarly to the corresponding components described above with respect to the head-mounted display 110. In some embodiments, the movable device 105 may also include a camera that provides a video feed to the head-mounted display 110 and a location component (for example, a global positioning satellite receiver) that provides a location of the movable device 105 to the head-mounted display 110.

As mentioned previously, in some embodiments, the head-mounted display 110 may send movement commands to the movable device 105. In some embodiments, the head-mounted display 110 controls the movable device 105 to move based on at least one of the eye gaze location of the eyes of the user, the depth of field of the eyes of a user, and a position of the head of the user.

In some embodiments, the head-mounted display 110 controls lateral movement of the movable device 105 based on the user looking left or right within a field of vision (that is, by determining a change in eye gaze location). The head-mounted display 110 may control vertical movement of the movable device 105 based on the user looking up or down within the field of vision (again, by determining a change in eye gaze location). For example, the head-mounted display 110 may transmit a movement command to the movable device 105 such that movable device 105 moves toward the determined eye gaze location of the user.

In some embodiments, the head-mounted display 110 may similarly control movement of the movable device 105 based on the position of the head of the user. For example, the head-mounted display 110 may transmit a movement command to the movable device 105 such that the movable device 105 moves to be in a certain position relative to the head-mounted display 110 (for example, centered within the field of vision of the user). In such embodiments, the head-mounted display 110 may control the movable device 105 to move laterally based on lateral head movements and vertically based on vertical head movements.

In some embodiments, lateral movement of the movable device 105 is movement that is parallel with the surface of the earth. In some embodiments, lateral movement of the movable device 105 may correspond to movement along an x-axis. In some embodiments, vertical movement of the movable device 105 is movement that is perpendicular with the surface of the earth. In some embodiments, vertical movement of the movable device 105 may correspond to movement along a y-axis.

In some embodiments, the head-mounted display 110 controls movement of the movable device 105 in a forward or backward direction based on the depth of field measurement of the eyes of the user. In some embodiments, forward and backward movement of the movable device 105 is movement away from or toward the head-mounted display 110 in a direction that is perpendicular to the lateral movement and vertical movement described previously. In some embodiments, forward and backward movement of the movable device 105 may correspond to movement along a z-axis. As an example, the head-mounted display 110 may transmit a movement command to the movable device 105 such that movable device 105 moves toward the determined depth of field measurement of the eyes of the user. However, as explained previously, the depth of field of the eyes of the user may only be measurable up to a predetermined distance because the lens distortion of the eyes no longer changes when the eyes focus at a distance beyond the predetermined distance. Accordingly, controlling forward and backward movement of the movable device 105 using the head-mounted display 110 may be accomplished when a desired location of the movable device 105 is within the range of measurable depth of field measurements of the eyes. However, when the desired location of the movable device 105 is outside the range of measurable depth of field measurements of the eyes, such control based on depth of field measurements may be difficult.

Figure 4:
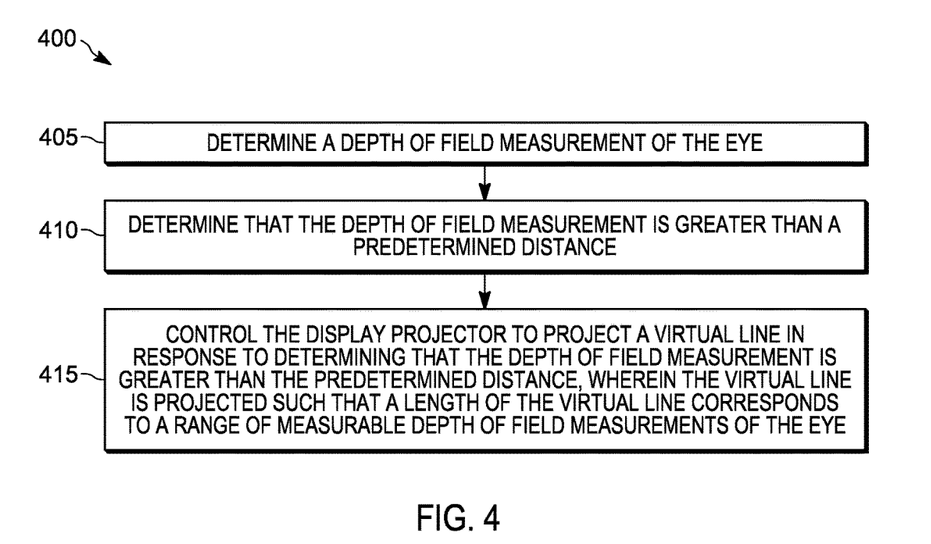
FIG. 4 is a flowchart of a method to control an object using the head-mounted display of FIG. 2 according to one embodiment.

To allow the head-mounted display 110 to control forward and backward movement of the movable device 105 based on the depth of field of the eyes of the user when a desired location or at least part of a range of travel of the movable device 105 is outside the range of measurable depth of field measurements of the eyes, the electronic processor 305 may perform a method 400 illustrated in FIG. 4.

FIG. 4 is a flow chart diagram of the method 400 performed by the electronic processor 305 to control an object using the head-mounted display 110 according to one embodiment. At block 405, the electronic processor 305 determines a depth of field measurement of an eye of the user. For example, the electronic processor 305 determines the depth of field measurement based on a lens distortion of the eye monitored by the eye tracking assembly 220 as explained previously. In some embodiments, the electronic processor 305 determines the depth of field measurement based on the lens distortion of both eyes of the user as monitored by the eye tracking assembly 220.

At block 410, the electronic processor 305 determines that the depth of field measurement is greater than a predetermined distance. In some embodiments, the predetermined distance may correspond to the range of measurable depth of field measurements of the eyes of the user (for example, approximately seven to ten meters). In some embodiments, the predetermined distance is less than or equal to the range of measurable depth of field measurements of the eyes of the user. The determination that the depth of field measurement is greater than the predetermined distance indicates that the electronic processor 305 is no longer able to distinguish between the depths of field of the eyes beyond the predetermined distance as explained previously.

At block 415, in response to determining that the depth of field measurement is greater than the predetermined distance, the electronic processor 305 controls the display projector 225 to project a virtual line that is viewable by the eyes of the user (for example, see virtual line 550 of FIGS. 5C through 5H). The virtual line is projected such that a length of the virtual line corresponds to a range of measurable depth of field measurements of the eye as explained in greater detail below with respect to FIG. 5C. In some embodiments, the virtual line 550 may be referred to as a virtual depth guidance element.

FIGS. 5A through 5I illustrate example fields of vision of the user while wearing the head-mounted display 110. In the examples shown, the field of vision 505 of the user includes a road 510, a sign 515, a first tree 520, a second tree 525, a horizon line 530, and a mountain range 535 on the horizon line 530. In the example fields of vision 505 in FIGS. 5A through 5I, the sign 515 is located three meters from the user, the first tree 520 is located six meters from the user, the second tree 525 is located fifteen meters from the user, and the mountain range 535 is located over one hundred meters from the user. As shown in FIGS. 5A through 5I, the field of vision 505 also includes the movable device 105. An eye symbol 540 is used throughout FIGS. 5A through 5I to indicate the eye gaze and depth of field of the user.

Figure 5A:
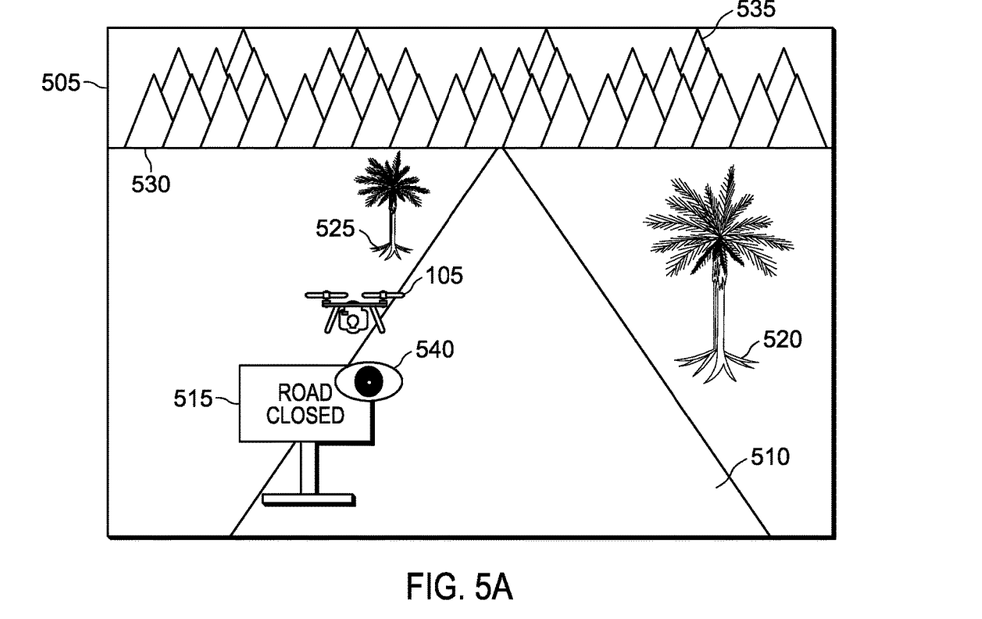
FIGS. 5A through 5I illustrate example fields of vision of a user wearing the head-mounted display of FIG. 2 according to one embodiment.

As shown in FIG. 5A, the eye gaze of the user is at or near the sign 515 and the depth of field of the eyes of the user is approximately three meters because the user is looking at or near the sign 515 which is three meters away. Accordingly, the movable device 105 is controlled to be positioned near the sign 515 based on the eye gaze and the depth of field measurement of the user as described previously. For example, when the electronic processor 305 of the head-mounted display 110 determines that the eyes of the user are looking at or near the sign 515, the head-mounted display 110 sends a movement command to the movable device 105 based on the eye gaze and depth of field measurement of the eyes of the user.

Figure 5B:
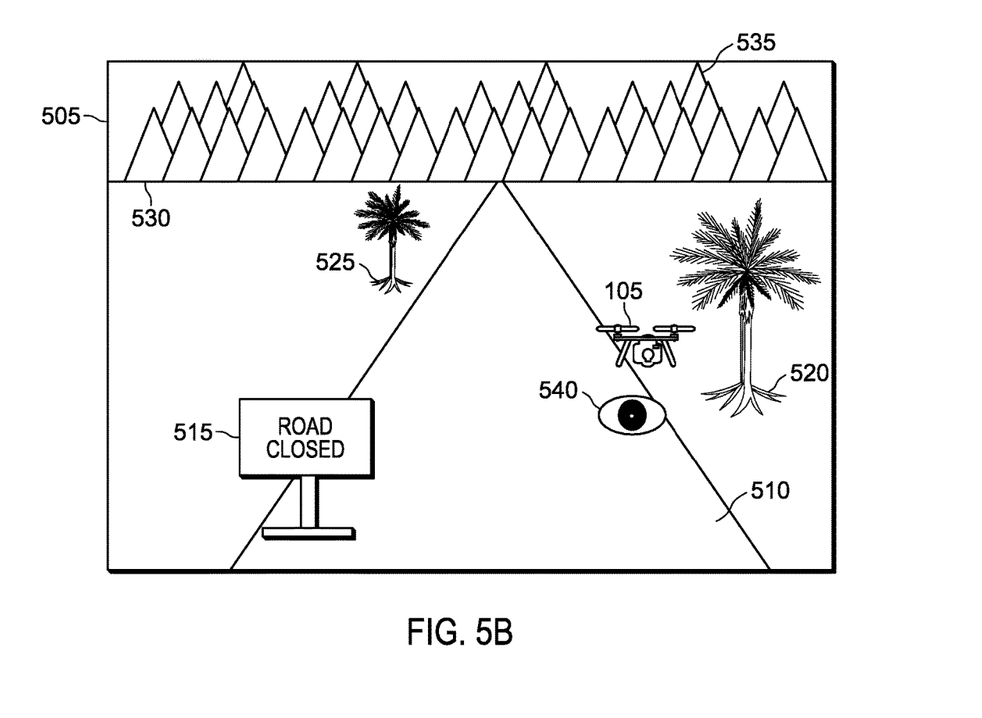

As shown in FIG. 5B, the eye gaze of the user has changed to be at or near the first tree 520 and the depth of field of the user is approximately six meters because the user is looking at or near the first tree 520 which is six meters away. Upon determining the updated eye gaze and the updated depth of field measurement of the user, the head-mounted display 110 sends a movement command to the movable device 105 based on the updated eye gaze and updated depth of field measurement of the eyes of the user such that the movable device 105 is controlled to be positioned near the first tree 520 as shown in FIG. 5B. In some embodiments, the movement command includes three-directional coordinates or movement instructions. For example, with respect to the change in location of the movable device 105 from FIG. 5A to FIG. 5B, the movement command may instruct the movable device 105 to move laterally to the right five meters, upward one meter, and away from the user three meters.

Figure 5C:
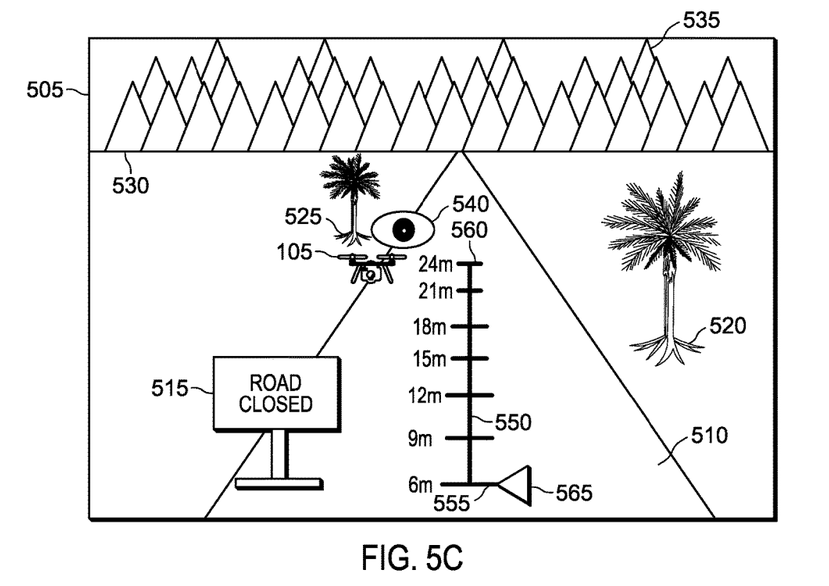

As shown in FIG. 5C, the eye gaze and the depth of field of the eyes of the user have changed to be at or near the second tree 525. Accordingly, the depth of field of the eyes of the user is outside the range of measureable depth of field measurements because the second tree 525 is located fifteen meters away from the user. The electronic processor 305 determines that the depth of field measurement of the eyes of the user is greater than the predetermined distance (for example, approximately seven to ten meters) as explained at block 410. As shown in FIG. 5C, in response to determining that the depth of field measurement of the eyes of the user is greater than the predetermined distance, the electronic processor 305 controls the display projector 225 to project a virtual line 550 that is viewable by the eyes of the user (at block 415). As mentioned previously, the virtual line 550 is projected such that a length of the virtual line 550 corresponds to a range of measurable depth of field measurements of the eye. For example, the virtual line 550 may be projected such that a first end 555 of the virtual line 550 that appears closest to the user appears to be at an approximate minimum focal distance of the eyes of the user (for example, twenty centimeters from the eyes of the user). A second end 560 of the virtual line 550 that appears farthest from the user may appear to be at approximately the predetermined distance (for example, seven to ten meters) from the eyes of the user. Accordingly, when the user is looking at the virtual line 550 (that is, when eye gaze location corresponds to the virtual line 550) and focused on a portion of the virtual line 550, the electronic processor 305 is able to determine a depth of field measurement of the eyes of the user because the virtual line 550 is projected such that the virtual line 550 corresponds to a range of measurable depth of field measurements.

The electronic processor 305 controls the display projector 225 to project the virtual line 550 to allow for control of movement of the movable device 105 toward or away from the user when the depth of field measurement of the user is greater than the range of depth of field measurements. With reference to FIGS. 5B and 5C, when the eyes of the user change eye gaze and depth of field to look at the second tree 525 instead of the first tree 520, the electronic processor 305 may determine the change in eye gaze of the user and control lateral and vertical movement of the movable device 105 accordingly. For example, the movement command from the head-mounted display 110 may control the movable device 105 to move eight meters to the left as shown by the change in location of the movable device 105 from FIG. 5B to FIG. 5C. However, because the depth of the field of the eyes of the user is greater than the range of measurable depth of field measurements as described previously, the electronic processor 305 may be unable to determine whether the depth of field of the eyes of the user is fifteen meters, thirty meters, fifty meters, or some other distance. Accordingly, the electronic processor 305 may wait to control movement of the movable device 105 forward or backward and instead controls the display projector 225 to project the virtual line 550 in the field of vision 505 of the user.

In some embodiments, the virtual line 550 includes virtual indicators (as shown in FIG. 5C) that indicate a scale of distances based on a distance between the head-mounted display 110 and the movable device 105. For example, an indicator on the first end 555 of the virtual line 550 may represent a current distance between the head-mounted display 110 and the movable device 105. With reference to FIG. 5C, the indicator on the first end 555 of the virtual line 550 represents six meters because the current distance between the head-mounted display 110 and the movable device 105 is six meters. In this example, each indicator on the virtual line 550 may represent an additional three meters. In some embodiments, the virtual line 550 includes labels that indicate the distance to which each indicator corresponds as shown in FIG. 5C. In some embodiments, the electronic processor 305 controls the display projector 225 to project a distance marker 565 to indicate the current distance between the movable device 105 and the head-mounted display 110.

Although FIG. 5C shows the indicator on the first end 555 of the virtual line 550 as representing the current distance between head-mounted display 110 and the movable device 105, in some embodiments, this indicator may represent a different distance (for example, the predetermined distance or another distance). In such embodiments, when the current distance between the head-mounted display 110 and the movable device 105 is less than the distance represented by the indicator on the first end 555 of the virtual line 550, the distance marker 565 may be projected below the virtual line 550 or may not be projected at all. In some embodiments, the distance represented by the indicators on the virtual line 550 change based on movement of the movable device 105 as described in greater detail below.

Figure 5D:
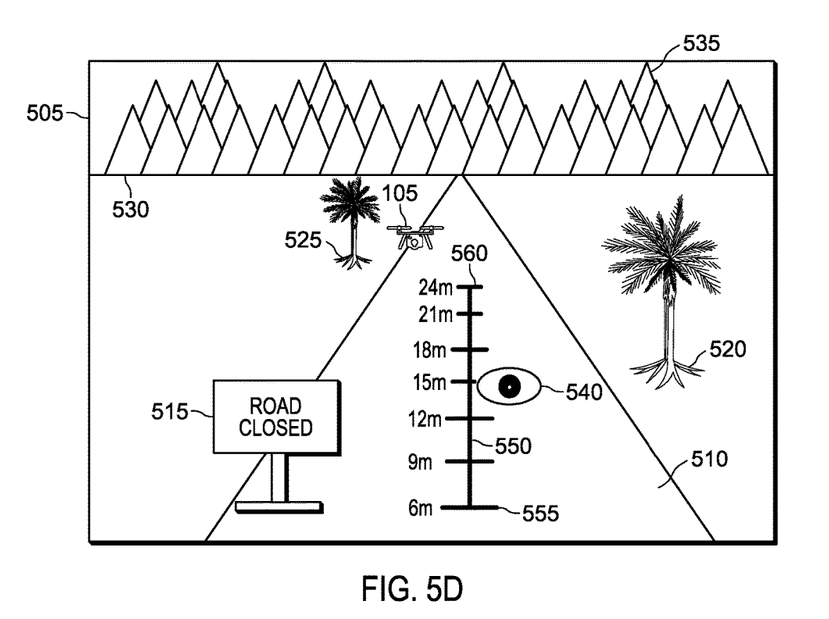

As shown in FIG. 5D, the eye gaze and the depth of field of the eyes of the user have changed to be at or near the fourth indicator of the virtual line 550 (that is, at or near the indicator labeled fifteen meters). Continuing the above example, the electronic processor 305 determines that the user is looking at and is focused on a portion of the virtual line 550 (that is, the fourth indicator) based on the eye gaze location and the depth of field measurement of the eyes of the user. Based on the determination that the eyes of the user are looking at and are focused on the fourth indicator on the virtual line 550, the electronic processor 305 controls the network interface 315 of the head-mounted display 110 to transmit a movement command to the movable device 105. In some embodiments, the movable device 105 moves forward or backward (that is, away from the user or toward the user) in response to the movement command. For example, because the fourth indicator corresponds to a distance of fifteen meters and the movable device 105 is currently located six meters from the user, the movement command may instruct the movable device 105 to move forward (that is, away from the user) nine meters to the approximate location shown in FIG. 5D. Accordingly, the electronic processor 305 is able to control forward and backward movement of the movable device 105 based on a depth of field of the eyes of the user when the distance between the movable device 105 and the head-mounted display 110 (or user) is greater than the range of measurable depth of measurements of the eyes of the user.

Figure 5E:
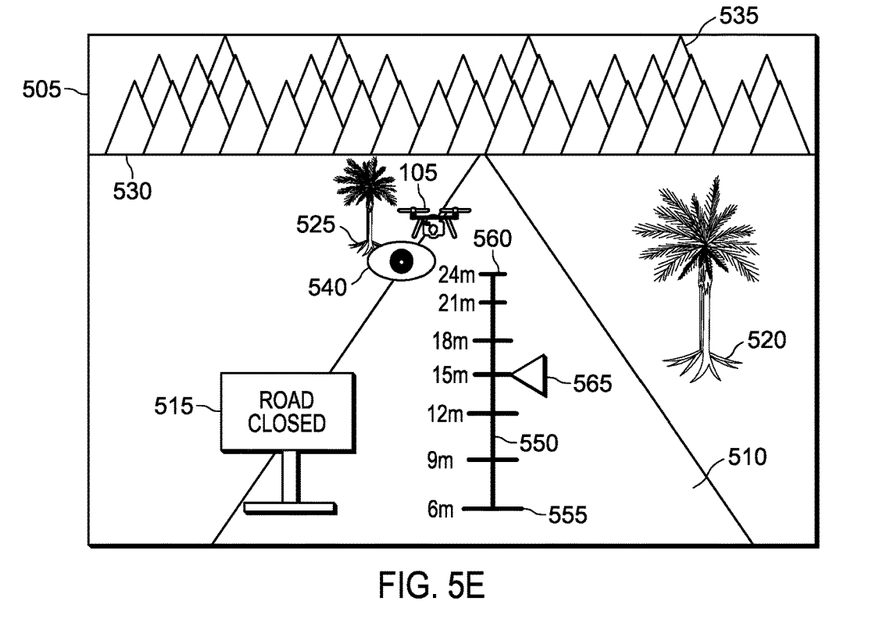

As shown in FIG. 5E, the eye gaze and depth of field of the eyes of the user have changed to be at or near the second tree 525. The electronic processor 305 determines that the eye gaze location is at or near the second tree 525. In doing so, the electronic processor 305 determines that the eyes of the user are looking at or focused on an area in the field of vision 505 other than the virtual line 550. Because the eyes of the user are not looking at and focused on a portion of the virtual line 550, the electronic processor 305 controls the network interface 315 to transmit a movement command to the movable device 105 to move the movable device 105 in at least one of up, down, and laterally based on at least one of the group consisting of the eye gaze location and the depth of field measurement. In this example, the movement command may not cause the movable device 105 to move because movable device 105 was previously moved to the location of the second tree 525 as explained previously with respect to FIGS. 5C and 5D. However, the electronic processor 305 may now control lateral and vertical movement of the movable device 105 based on eye gaze location of the user when the movable device 105 is fifteen meters away from the user. During such control, the electronic processor 305 may not control the movable device 105 to move toward or away from the user because the desired distance between the movable device 105 and the head-mounted display 110 was previously set based on the determined depth of field of the eyes of the user when the eye gaze location was the fourth indicator of the virtual line 550 (as explained previously with respect to FIG. 5D). In some embodiments, the electronic processor 305 controls the display projector 225 to project the distance marker 565 to indicate an approximate distance between the movable device 105 and the head-mounted display 110 that has been selected by the user. In some embodiments, the distance marker 565 may move along the virtual line 550 as the eyes of the user move along the virtual line 550.

In some embodiments, the electronic processor 305 may additionally or alternatively control lateral and vertical movement of the movable device 105 based on head movement of the user (for example, by monitoring one or more gyroscopes or accelerometers included in the head-mounted display 110). In some embodiments, the electronic processor 305 is configured to determine a change in direction of a direction that the head-mounted display 110 is facing. For example, the change in direction may be a lateral change in direction as the head of the user is turned left or right. As another example, the change in direction may be a vertical change in direction as the head of the user is tilted up or down. In such embodiments, the electronic processor 305 controls the network interface 315 to transmit a movement command to the movable device 105 to move the movable device 105 in at least one of up, down, and laterally based on the change in direction of the head-mounted display 110.

Figure 5F:
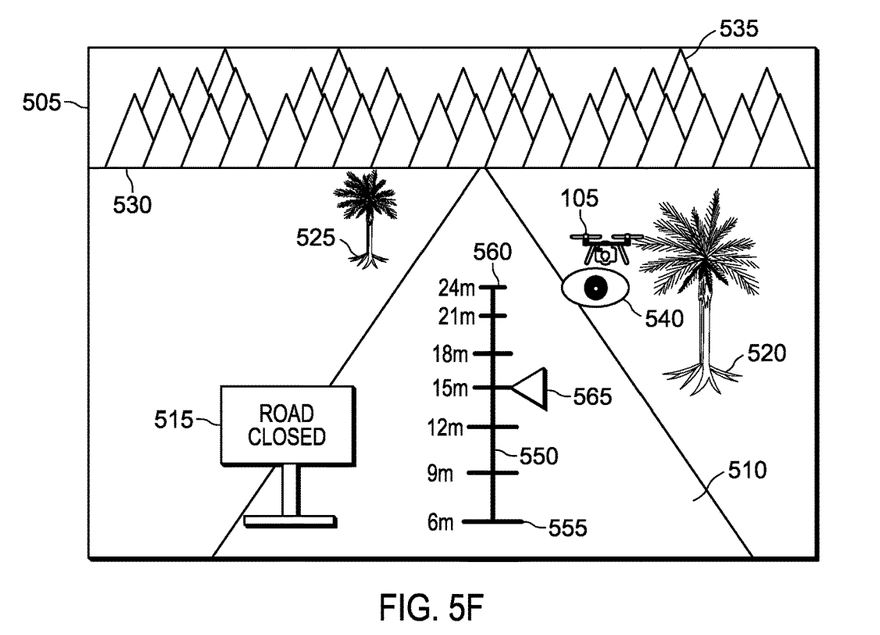
Figure 5G:
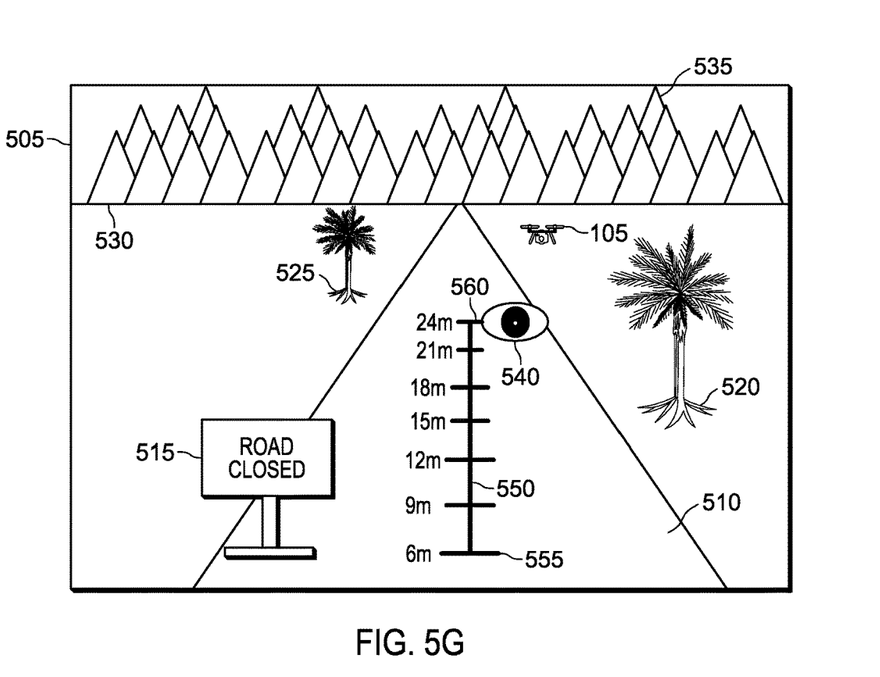

Continuing the previous example from FIG. 5E, when the eye gaze location of the user changes to the right side of the road 510 but the depth of field of the eyes of the remains greater than the predetermined distance, the movement command from the head-mounted display 110 controls the movable device 105 to move to the right side of the road 510 and remain approximately fifteen meters from the head-mounted display 110 (for example, see FIG. 5F). To move the movable device 105 farther away from or closer to the head-mounted display 110, the virtual line 550 is used. For example, when the electronic processor 305 determines that the eye gaze location and the depth of field of the eyes of the user are at or near the twenty-four meter indicator at the second end 560 of the virtual line 550, the head-mounted display 110 transmits a movement command to the movable device 105 to move away nine more meters away from the user (that is, to approximately twenty-four meters away from the user as shown in FIG. 5G).

Figure 5H:
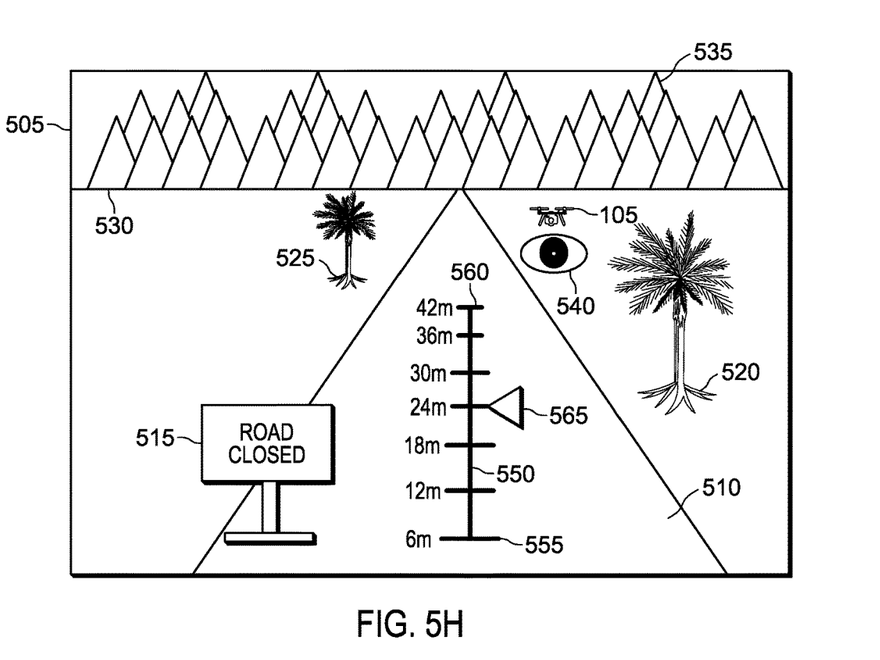

In some embodiments, the electronic processor 305 is configured to update the indicators on the virtual line 550 to change the scale of distances in response to the distance between the movable device 105 and the head-mounted display 110 on the user changing. For example, when the movable device 105 is controlled to move such that it is located twenty-four meters from the head-mounted display 110, the labels of the indicators on the virtual line 550 may by updated as shown in FIG. 5H. Although the virtual line 550 of FIG. 5H includes the same label for the indicator at the first end 555 of the virtual line 550 as that of FIG. 5G, in some embodiments, the indicators of the virtual line 550 may be updated differently. For example, the indicators of the virtual line 550 may be updated such that the virtual line 550 represents the same total distance in all situations. In this example, the updated virtual line 550 may include the following indicator labels: 15m, 18m, 21m, 24m, 27m, 30m, and 33m. In some embodiments, the electronic processor 305 may update the indicators on the virtual line 550 in other manners in response to the distance between the movable device 105 and the head-mounted display 110 changing. For example, when the distance between the head-mounted display 110 and the movable device 105 is greater than the predetermined distance, the electronic processor 305 may update the indicator at the first end 555 of the virtual line 550 to represent the predetermined distance. Also as shown in FIG. H, after setting the distance of twenty-four meters, the eyes of the user have moved back to the location of the eye symbol 540 on the right side of the road 510 near the movable device 105.

Figure 5I:
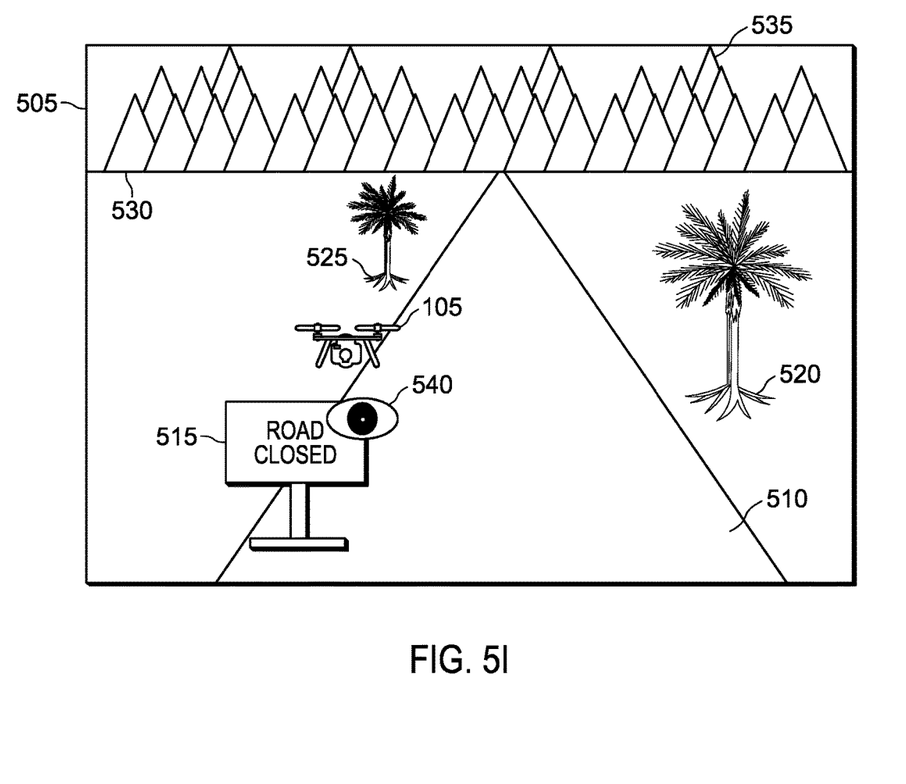

Continuing the example from FIG. 5H, the eye gaze location of the user may change such that the eyes are not looking at the virtual line 550 and the depth of field of the eyes of the user is less than or equal to the predetermined distance (for example, within the measurable range of depth of field measurements). For example, as shown in FIG. 5I, the eyes may look back at and focus on the sign 515. In such a situation, the electronic processor 305 determines the eye gaze location and depth of field measurement of the eyes of the user. The electronic processor 305 then determines that the eyes are not looking at the virtual line 550 and that the depth of field measurement is less than or equal to the predetermined distance. In response to this determination, the electronic processor 305 controls the display projector 225 to cease projecting the virtual line 550. The electronic processor 305 then controls the network interface 315 to transmit a movement command to the movable device 105 to move the movable device 105 based on the updated eye gaze location and the updated depth of field measurement.

In such a situation, the virtual line 550 may no longer be used to control the movable device 105 in a direction toward or away from the user because the electronic processor 305 is able to determine the depth of field measurement of the user. For example, with respect to the change in location of the movable device 105 from FIG. 5H to FIG. 5I, the electronic processor 305 determines that the eye gaze location is at or near the sign 515 and the depth of field measurement of the eyes of the user is approximately three meters because the user is focused on the sign 515 which is approximately three meters from the user. Because the depth of field measurement corresponds to a distance of three meters and the movable device 105 is currently located twenty-four meters from the user (in FIG. 5H), the movement command may control the movable device 105 to move backward (that is, toward the head-mounted display 110) twenty-one meters. The movement command may also control the movable device 105 to move, for example, eight meters to the left and two meters downward such that the movable device 105 is located near the sign 515 as shown in FIG. 5I.

As illustrated by the examples shown in FIGS. 5A through 5I, when the depth of field of the eyes of the user is less than or equal to the predetermined distance (for example, within the range of measurable depth of field measurements), the electronic processor 305 is able to control movement of the movable device 105 in three dimensions by determining an eye gaze location (and/or head movement) and a depth of field measurement of the eyes of the user. When the depth of field of the eyes of the user is greater than the predetermined distance, the electronic processor 305 is still able to control lateral and vertical movement of the movable device 105 based on eye gaze location and/or head movement. However, in such situations, the electronic processor 305 controls movement of the movable device 105 toward and away from the head-mounted display 110 by determining when and where the eyes of the user are focused on the virtual line 550. In other words, the user is able to control movement of the movable device 105 toward and away from the head-mounted display 110 by looking at and focusing on a portion of the virtual line 550, and the user is able to control lateral and vertical movement of the movable device 105 by looking at and focusing on areas within the field of vision 505 besides the virtual line 550.

Although the examples of FIGS. 5A through 5I include a field of vision 505 that includes tangible objects (for example, the sign 515 and the trees 520 and 525 among others) and the movable device 105 is shown as a drone, in some embodiments, the head-mounted display 110 is a virtual reality head-mounted display. In such embodiments, the objects in the field of vision 505 are virtual objects generated by the display projector 225. Similarly, the movable object 105 is a movable virtual object generated by the display projector 225. The electronic processor 305 is configured to execute the method 400 to control the display projector 225 such that the virtual object appears to move forward or backward based on a determination that the eyes of the user are looking at and focused on a portion of the virtual line 550 as explained previously with respect to the movable object 105. The electronic processor 305 is also configured to control the display projector 225 such that the virtual object appears to move laterally and vertically based on a determined eye gaze location or head movement of the user as explained previously with respect to the movable object 105.

In some embodiments, the head-mounted display 110 may include a user input (for example, the button or virtual line actuator 230) that controls whether the virtual line 550 is displayed by the display projector 225. In such embodiments, the button may be pressed to cause the electronic processor 305 to control the display projector 225 to project the virtual line 550 to be visible to the user. The electronic processor 305 then determines the eye gaze location and the depth of field measurement of the eyes of the user to control movement of the movable device 105 as described previously. For example, the electronic processor 305 may transmit a movement command to the movable device 105 based on a determination that the eyes are looking at and focused on a portion of the virtual line 550. When the user has controlled the forward or backward movement of the movable device 105 as desired by looking at and focusing on the virtual line 550, the user may press the button again to cause the electronic processor 305 to control the display projector 225 to cease projecting the virtual line 550. The electronic processor 305 may then control lateral and vertical movement of the movable device 105 based on eye gaze location or head movement of the user as explained previously.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A head-mounted display, comprising:
a display projector;
an eye tracking assembly configured to monitor an eye; and
an electronic processor coupled to the display projector and the eye tracking assembly and configured to
determine a depth of field measurement of the eye, determine that the depth of field measurement is greater than a predetermined distance, wherein the predetermined distance is within a range of measurable depth of field measurements of the eye and wherein determining that the depth of field measurement is greater than the predetermined distance indicates that the depth of field measurement is outside the range of measurable depth of field measurements, and control the display projector to project a virtual line in response to determining that the depth of field measurement is greater than the predetermined distance, wherein the virtual line is projected such that a length of the virtual line corresponds to the range of measurable depth of field measurements of the eye.

2. The head-mounted display of claim 1, wherein the electronic processor is further configured to determine an eye gaze location and a second depth of field measurement of the eye;

determine that the eye is looking at and is focused on a portion of the virtual line based on the eye gaze location and the second depth of field measurement; and control a network interface to transmit a movement command to a movable device to move the movable device based on the eye gaze location and the second depth of field measurement.

3. The head-mounted display of claim 2, wherein the movable device moves forward or backward in response to the movement command.

4. The head-mounted display of claim 2, wherein the virtual line includes indicators that indicate a scale of distances based on a second distance between the head-mounted display and the movable device.

5. The head-mounted display of claim 4, wherein the electronic processor is further configured to update the indicators to change the scale of distances in response to the second distance changing.

6. The head-mounted display of claim 1, wherein the electronic processor is further configured to:

determine a change in direction of a direction that the head-mounted display is facing; and control a network interface to transmit a movement command to a movable device to move the movable device in at least one of up, down, and laterally based on the change in direction.

7. The head-mounted display of claim 1, wherein the electronic processor is further configured to:

determine an eye gaze location and a second depth of field measurement of the eye;

determine that the eye is looking at or is focused on an area in a field of vision besides the virtual line based on the eye gaze location and the second depth of field measurement; and control a network interface to transmit a movement command to a movable device to move the movable device in at least one of up, down, and laterally based on at least one of the group consisting of the eye gaze location and the depth of field measurement.

8. The head-mounted display of claim 1, wherein the electronic processor is further configured to:

determine an eye gaze location and a second depth of field measurement of the eye;

determine that the eye is not looking at the virtual line based on the eye gaze location and that the second depth of field measurement is less than or equal to the predetermined distance;

control the display projector to cease projecting the virtual line in response to determining that the eye is not looking at the virtual line and that the second depth of field measurement is less than or equal to the predetermined distance; and control a network interface to transmit a movement command to a movable device to move the movable device based on the eye gaze location and the second depth of field measurement.

9. The head-mounted display of claim 1, wherein the electronic processor is further configured to determine an eye gaze location and a second depth of field measurement of the eye;

determine that the eye is looking at and is focused on a portion of the virtual line based on the eye gaze location and the second depth of field measurement; and control the display projector such that a virtual object appears to the eye to move based on the eye gaze location and the second depth of field measurement.

10. The head-mounted display of claim 1, wherein the virtual line is projected such that a first end of the virtual line that appears closest to the eye is projected to appear at approximately a minimum depth of field of the eye and a second end of the virtual line that appears farthest from the eye is projected to appear at approximately the predetermined distance.

11. A method of controlling an object using a head-mounted display, the method comprising:

determining, with an electronic processor, a depth of field measurement of an eye based on information received from an eye tracking assembly monitoring the eye;

determining, with the electronic processor, that the depth of field measurement is greater than a predetermined distance, wherein the predetermined distance is within a range of measurable depth of field measurements of the eye and wherein determining that the depth of field measurement is greater than the predetermined distance indicates that the depth of field measurement is outside the range of measurable depth of field measurements; and controlling, with the electronic processor, a display projector to project a virtual line in response to determining that the depth of field measurement is greater than the predetermined distance, the virtual line being projected such that a length of the virtual line corresponds to the range of measurable depth of field measurements of the eye.

12. The method of claim 11, further comprising:

determining, with the electronic processor, an eye gaze location and a second depth of field measurement of the eye;

determining, with the electronic processor, that the eye is looking at and is focused on a portion of the virtual line based on the eye gaze location and the second depth of field measurement; and controlling, with the electronic processor, a network interface to transmit a movement command to a movable device to move the movable device based on the eye gaze location and the second depth of field measurement.

13. The method of claim 12, wherein the movable device moves forward or backward in response to the movement command.

14. The method of claim 12, wherein the virtual line includes indicators that indicate a scale of distances based on a second distance between the head-mounted display and the movable device.

15. The method of claim 14, further comprising, updating, with the electronic processor, the indicators to change the scale of distances in response to the second distance changing.

16. The method of claim 11, further comprising:
determining, with the electronic processor, an eye gaze location and a second depth of field measurement of the eye;
determining, with the electronic processor, that the eye is looking at or is focused on an area in a field of vision besides the virtual line based on the eye gaze location and the second depth of field measurement; and
controlling, with the electronic processor, a network interface to transmit a movement command to a movable device to move the movable device in at least one of up, down, and laterally based on at least one of the group consisting of the eye gaze location and the depth of field measurement.

17. The method of claim 11, further comprising:
determining, with the electronic processor, an eye gaze location and a second depth of field measurement of the eye;
determining, with the electronic processor, that the eye is not looking at the virtual line based on the eye gaze location and that the second depth of field measurement is less than or equal to the predetermined distance;
controlling, with the electronic processor, the display projector to cease projecting the virtual line in response to determining that the eye is not looking at the virtual line and that the second depth of field measurement is less than or equal to the predetermined distance; and
controlling, with the electronic processor, a network interface to transmit a movement command to a movable device to move the movable device based on the eye gaze location and the second depth of field measurement.

18. The method of claim 11, further comprising:
determining, with the electronic processor, an eye gaze location and a second depth of field measurement of the eye;
determining, with the electronic processor, that the eye is looking at and is focused on a portion of the virtual line based on the eye gaze location and the second depth of field measurement; and
controlling, with the electronic processor, the display projector such that a virtual object appears to the eye to move based on the eye gaze location and the second depth of field measurement.

19. The method of claim 11, wherein controlling the display projector to project the virtual line such that the length of the virtual line corresponds to the range of measurable depth of field measurements of the eye includes controlling the display projector to project the virtual line such that a first end of the virtual line that appears closest to the eye is projected to appear at approximately a minimum depth of field of the eye and a second end of the virtual line that appears farthest from the eye is projected to appear at approximately the predetermined distance.

20. An apparatus, comprising:
an eye tracking assembly configured to determine eye gaze of an eye and determine a depth of field measurement of the eye based on a lens distortion of the eye;
a display projector coupled to the eye tracking assembly, wherein the display projector projects a virtual depth guidance element in response to the depth of field measurement exceeding a predetermined threshold,
wherein the predetermined threshold is a predetermined distance within a range of measurable depth of field measurements of the eye,
wherein the depth of field measurement exceeding the predetermined threshold indicates that the depth of field measurement is outside the range of measurable depth of field measurements of the eye, and
wherein the virtual depth guidance element includes one or more virtual indicators each corresponding to a measurable depth of field measurement of the eye within the range of measurable depth of field measurements of the eye; and
a network interface configured to transmit a movement command to a movable device, wherein the movement command corresponds to a second depth of field measurement of the eye determined when the eye is looking at and is focused on one of the one or more virtual indicators on the virtual depth guidance element.

* * * * *